United States Patent [19]

Perrington et al.

[11] 3,775,178

[45] Nov. 27, 1973

[54] DUAL-LAYER QUADRUPLEX VIDEO RECORDING TAPE

[75] Inventors: Kenneth J. Perrington, New Brighton; Peter J. Vogelgesang, Roseville; James K. Knudsen, St. Paul, all of Minn.

[73] Assignee: Minnesota Mining & Manufacturing Company, St. Paul, Minn.

[22] Filed: Aug. 26, 1971

[21] Appl. No.: 175,106

[52] U.S. Cl. .................................. 117/239, 117/238
[51] Int. Cl. .............................................. H01f 10/02
[58] Field of Search ...................... 117/238, 239, 240

[56] References Cited

UNITED STATES PATENTS

| | | | |
|---|---|---|---|
| 2,643,130 | 6/1953 | Kornei | 117/71 X |
| 3,573,980 | 4/1971 | Haller et al. | 117/238 |
| 3,505,109 | 4/1970 | Schnell et al. | 117/237 |
| 3,679,476 | 4/1970 | Oosterhout et al. | 117/235 X |
| 3,470,021 | 9/1969 | Henricx et al. | 117/235 X |
| 3,597,273 | 8/1971 | Akashi et al. | 117/235 |

FOREIGN PATENTS OR APPLICATIONS

| | | | |
|---|---|---|---|
| 246,590 | 10/1960 | Australia | 117/238 UX |

*Primary Examiner*—William D. Martin
*Assistant Examiner*—Bernard D. Pianalto
*Attorney*—Kinney, Alexander, Sell, Steldt & Delahunt

[57] ABSTRACT

Quadruplex video recording tape having a dual-layer magnetizable coating to provide improved RF output and video signal-to-noise ratio and also greater audio output and sensitivity. The magnetizable particles of the inner layer should be magnetically oriented longitudinally and provide a coercivity of 240–600 oersteds in the longitudinal direction. The magnetizable particles of the outer layer are magnetically oriented in the crosswise direction and provide a crosswise coercivity of 375–1,000 oersteds.

3 Claims, 2 Drawing Figures

Figure 1:
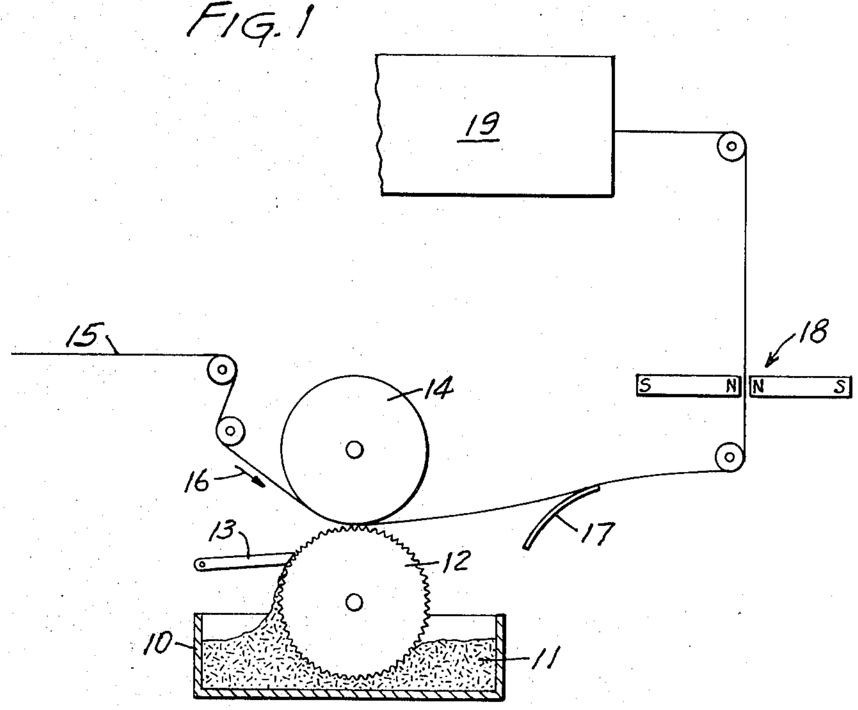

INVENTORS
KENNETH J. PERRINGTON
PETER J. VOGELGESANG
JAMES K. KNUDSEN
BY Kinney, Alexander
Sell, Steldt, & De La Hunt
ATTORNEYS

DUAL-LAYER QUADRUPLEX VIDEO RECORDING TAPE

FIELD OF THE INVENTION

This invention concerns magnetic recording tape of the type having a coating of magnetizable particles in a nonmagnetizable binder. The invention is particularly concerned with quadruplex video recording tape wherein the video tracks extend nearly in the crosswise direction and the audio and control tracks extend longitudinally along the edges of the tape.

CROSS-REFERENCE TO RELATED APPLICATION

Applicants' copending application Ser. No. 119,190, filed Feb. 26, 1971, and now abandoned, concerns magnetic recording tape having a dual-layer magnetizable coating which provides improved high frequency response when used in conventional audio recording devices. A significant portion of the teachings there are applicable here.

BACKGROUND OF THE INVENTION

Quadruplex video recorders are presently standard for television broadcasting. Television programs are routinely recorded on quadruplex video recording tape, and many copies may be made from the original tape. In making a copy, there is a loss of about 1.5 db in signal-to-noise ratio. Often additional copies are made from the first copy so that the second generation copies are down 3 db in signal-to-noise ratio. With present commercial tapes, the second generation copies are of marginal quality for commercial broadcast. Sometimes it becomes necessary to broadcast third and even fourth generation copies, even though they may not be quite satisfactory. Thus there is considerable need for a quadruplex video tape having higher signal-to-noise ratio to permit second, third and fourth generation copies of suitable broadcast quality.

Quadruplex video recorders presently have a longitudinal tape speed of 15 inches per second. To reduce tape costs, to save tape storage space, and to increase tape playing time, the video recording industry desires to reduce the longitudinal tape speed. Since a reduction in longitudinal tape speed necessitates a reduction in video track width, video head rotational velocity, or both, slower longitudinal tape speed would result in lower signal-to-noise ratio. A video tape having improved signal-to-noise ratio would permit slower tape speeds without attendant loss in picture quality characteristic of existing video recording tapes.

Substantially all quadruplex video tapes now on the market employ acicular gamma-$Fe_2O_3$ particles as the magnetizable medium. Without modification, such particles provide coercivities up to about 425 oersteds. Particles of higher coercivity would provide higher RF output and video signal-to-noise ratios, assuming they are magnetically anisotropic and can be oriented with their magnetically anisotropic axes extending generally in the crosswise direction of the tape (essentially in the direction of the head-to-tape path). Such result can be obtained by modifying the gamma-iron oxide with cobalt oxide as disclosed in U. S. Pat. No. 3,573,980. Chromium dioxide particles are also applicable, but even though chromium dioxide recording tapes having high coercivity appeared on the market in experimental quantities about ten years ago, they are not being commercially offered for quadruplex video use. Reportedly chromium dioxide is too abrasive for such use. It is also relatively expensive. Acicular cobalt oxide modified gamma-iron oxide particles are less expensive, but quadruplex video tapes made therewith as of the present date exhibit some signal print-through, i.e., transfer of signal from one layer of the tape to the next in a convolute roll of the tape. Primarily the print-through occurs in the audio and control tracks.

Because the magnetizable particles of existing quadruplex video tape are oriented so that their magnetically anisotropic axes extend crosswise to the tape whereas the audio tracks extend in the longitudinal direction, the audio output and sensitivity suffer. If the tape speed were reduced, audio reproduction would suffer further. There is a desire in the television broadcasting industry to divide the audio track into two stereo tracks for multiplexed transmission, and this would also deteriorate the audio quality. Hence, there is need for a quadruplex video recording tape which has greater audio output and sensitivity as well as improved video signal-to-noise ratio so that at the very least, achievements such as reduced tape speed will not be realized at the expense of audio reproduction.

THE PRIOR ART

The most pertinent prior art is believed to be Kornei U.S. Pat. No. 2,643,130. Kornei discloses a multi-layer magnetic recording tape, the outermost layer of which has very high coercivity while the inner layers have progressively lower coercivity. While Kornei was particularly concerned with simultaneously optimizing bias levels for both long and short wavelengths in audible range recording, any similarity to the present invention ends there. Kornei teaches that it is desirable to employ magnetizable materials having hysteresis loops of more slanting slope whereas the hysteresis loops of magnetizable materials for the present invention are as square as possible.

THE PRESENT INVENTION

The present invention primarily concerns magnetic recording tape which in quadruplex video use affords significantly improved video signal-to-noise ratio as well as greater audio output and sensitivity. These improvements are accomplished by tape having a dual-layer magnetizable coating of about 2–15 microns total thickness, each of which layers is a homogeneous admixture comprising by weight a major proportion of magnetically anisotropic particles and a minor proportion of nonmagnetizable binder. The inner magnetizable layer has a thickness of at least 1.25 microns and its magnetizable particles are oriented so that their magnetically anisotropic axes extend predominantly in the longitudinal direction of the tape and provide a coercivity of 240–600 oersteds (longitudinally). The outer magnetizable layer has a thickness of 0.5–3 microns and its magnetizable particles are oriented so that their magnetically anisotropic axes extend predominantly in the crosswise direction of the tape and provide a crosswise coercivity of 375–1,000 oersteds and greater than the longitudinal coercivity of the inner layer.

Because of the favorable orientation of the magnetizable particles of the inner layer, the aforementioned improvements can be achieved with a tape whose dual-layer magnetizable coating has less overall thickness than would a comparable single-layer recording tape.

A tape of the present invention having an inner layer of 9.5 microns thickness and 320 oersteds coercivity and an outer layer of 1.5 microns thickness and 480 oersteds coercivity provides greater audio output and sensitivity than a conventional quadruplex tape having a single layer of 320 oersteds coercivity and 12.5 microns thickness.

A presently preferred construction of the novel tape has a biaxially-oriented polyethylene terephthalate backing member about 20–25 microns in thickness, an inner magnetizable layer 5.5 to 8 microns in thickness comprising ordinary acicular gamma-$Fe_2O_3$ particles having a coercivity of 300–350 oersteds, and an outer magnetizable layer 1–2 microns in thickness comprising cobalt oxide modified acicular gamma-$Fe_2O_3$ particles having a coercivity of 400–600 oersteds. The outer magnetizable layer should not exceed 2.5 microns in thickness to keep print-through to a minimum. If the outer magnetizable layer comprised chromium dioxide, it could be somewhat thicker, e.g., 3 microns.

At the tape speed of present quadruplex video recorders, an outer magnetizable layer of less than 1.25 microns would be inadequate to record the desired range of video signals. Reduction of video head rotational velocity and/or reduction of video track width would permit reduction in tape speed. If tape speed and video head rotational velocity were reduced by 50 percent, the wave lengths of the video signals would be halved, thus making feasible a thickness of 0.6–0.7 micron for the outer layer. Another 50 percent reduction in tape and video head speeds would permit a corresponding reduction in thickness of the outer layer. However, an outer magnetizable layer less than 0.6 micron in thickness having sufficient uniformity for commercial use has not been attained at a suitably high proportion of magnetizable particles, and it is difficult in the present state of the art to attain uniformity at 0.7–0.8 micron. Hence, it is presently preferred that the outer layer be at least 1 micron in thickness even if wave lengths of the video signal would be compatible with a thinner coating.

While keeping the foregoing considerations in mind, the outer magnetizable layer should be as thin as possible in order to minimize the separation between the audio head and the longitudinally oriented layer of magnetizable particles.

For present day audio head-to-tape speed, the inner magnetizable layer should have a thickness of at least 5.5 microns, below which the audio output drops off to an undesirable extent. A 50 percent reduction in head-to-tape speed would reduce audio wavelengths 50 percent, thus permitting a 50 percent reduction in thickness of the inner layer. Further reductions in head-to-tape speed would permit corresponding reductions in inner layer thickness, but it is doubted that such thickness would ever be less than 1.25 microns.

There is no technical disadvantage to greater thicknesses for the inner magnetizable layer except that the total thickness of the dual-layer magnetizable coating should not exceed 15 microns. Above that the tape may become too thick for physical compatibility with quadruplex video equipment. On the other hand, thinner coatings permit greater lengths of tape to be wound on a given reel and also permit economies in raw material cost.

The outer magnetizable layer of the presently preferred embodiment of the present invention has a coercivity within about 400–600 oersteds in order to be compatible with existing quadruplex video recorders. Higher coercivities will permit reduced tape speeds with no reduction in video signal-to-noise and thus are preferred up to a practical upper limit of about 1,000 oersteds.

In general it is desirable that the coercivity of the inner magnetizable layer be as high as possible while still being compatible with the audio recording equipment. In existing quadruplex recorders, problems with recording compatibility may be encountered if the coercivity of the inner magnetizable layer exceeds 360 oersteds. If and when the tape speed is reduced below 15 inches per second and/or the audio track is divided into two stereo tracks, it will be necessary to redesign the audio circuitry and desirable to increase the coercivity of the inner magnetizable layer to as much as 600 oersteds.

In the likely event of such redesign, the inner magnetizable layer of a preferred tape of the present invention may comprise chromium dioxide particles of 450–600 oersteds and have a thickness of about 2.5 microns, and the outer magnetizable layer may comprise cobalt oxide modified acicular gamma-ferric oxide or other particles of 700–900 oersteds and have a thickness of about 1.25 microns. In such construction, the chromium dioxide particles would not contact the heads so that abrasivity would not be a problem, and the inner layer would be sufficiently thin to permit reasonably economical use of the high-priced chromium dioxide.

In order to provide desirably high output, each magnetizable layer should comprise a major proportion by weight of magnetizable particles. A high proportion of magnetizable particles to binder is particularly beneficial in the outer layer, e.g., at least 3 and preferably about 4–5 parts by weight of particles to one part of all non-magnetizable materials in the binder portion. The same high proportion is also preferred for the inner layer, especially where the inner magnetizable coating has a thickness of less than 5 microns.

The magnetic recording tape of the present invention may be manufactured by sequentially applying to the backing member uniform coatings of dispersions of magnetizable particles and nonmagnetizable binder in a volatile vehicle. The binder of the inner layer may include a crosslinking agent which will cure the binder sufficiently to be resistant to the volatile vehicle used in applying the outer layer. It may be necessary after applying the inner layer to retain the tape at room temperature or at moderately elevated temperatures for a time to permit the inner layer to develop sufficient solvent resistance. After the inner layer has developed the necessary degree of solvent resistance, a second dispersion of binder and particles of relatively high coercivity is then applied over the inner layer. This is so thin that the volatile vehicle may evaporate too quickly to permit the usual smoothing, orienting and polishing procedures unless it is selected to have a slow evaporation rate. As in the application of any magnetizable coating, each dispersion should contain a surfactant which is compatible with the volatile vehicle to insure uniformity as well as adequate adhesion of the magnetizable particles to the binder.

If desired, an ultra-thin nonmagnetizable coating may be applied between the inner and outer layers for such purposes as to improve adhesion between the magnetizable layers or to facilitate smoothness of the outer layer.

There are several factors in attaining good video response and consequent high signal-to-noise ratio. In order to attain the intimate tape-to-head contact necessary for good video response the surface of the tape should have a peak to valley roughness not exceeding about 0.15 micron and preferably less than 0.075 micron as measured on the Bendix Proficorder using a 2.5-micron diamond stylus. The dual-layer construction of the tape of the present invention lends itself to the attainment of an extraordinarily smooth surface by employing conventional polishing procedures both after applying the inner magnetizable layer and after applying the outer layer. These doubly polished tapes are believed to have better surface smoothness than single-layer tapes of the prior art, which have received a conventional polishing treatment.

Video response is also improved by increased $B_r$, by increased $H_c/B_r$ and by increased slope of the hysteresis loop. To provide increased $B_r$ and steep slope, the particles of the outer magnetizable layer should be oriented so their preferred magnetic axes are aligned as much as possible in the crosswise direction.

THE DRAWING

Figure 2:
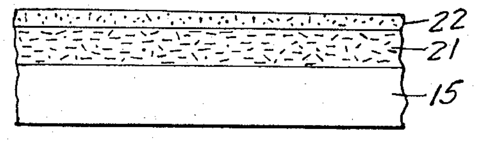

In the drawing:

FIG. 1 schematically shows a gravure coater useful for making the novel magnetic recording tape; and FIG. 2 schematically shows a longitudinal edge view of a typical magnetic recording tape of the present invention.

The gravure coater of FIG. 1 includes a tank 10 which is continuously supplied with a dispersion 11 of magnetizable particles and binder. This is picked up in the fine grooves of a gravure roll 12 which is scraped by a doctor blade 13 so that substantially the only material left is that contained in the grooves. The dispersion is pressed by a rubber roll 14 into contact with and transferred to an uncoated backing member 15 which is moving at the same speed and in the same direction as the gravure roll 12, as indicated by the arrow 16. Before significant evaporation of the volatile vehicle, the knurl pattern of the coating is smoothed out by a flexible blade 17. The coated backing member then passes between a pair of bar magnets 18 to physically align the magnetizable particles as described in von Behren U.S. Pat. No. 2,711,901, and on to a heated oven 19 to dry the coating.

After the binder of the resultant coating has cured sufficiently to resist the volatile vehicle of the second dispersion, the coated tape may be carried through the same apparatus to apply an outer magnetizable layer directly over the inner layer, except that the orienting field is rotated to permit crosswise orientation of the particles. To make the outer layer thinner than the inner layer, a gravure roll is used which has finer grooves. The resultant two-layer tape, as greatly enlarged in FIG. 2, has a backing member 15, a relatively thick inner magnetizable layer 21 and a relatively thin outer layer 22.

In the following example, "parts by weight" indicates pounds.

EXAMPLE

The following were charged to a water-cooled production ball mill:

| | Parts by weight |
|---|---|
| 15% solution of polyurethane elastomer in methyl ethyl ketone/toluene (4:1) | 392 |
| 30% solution of phenoxy resin in methyl ethyl ketone | 102.5 |
| Toluene | 22 |
| Methyl ethyl ketone | 34 |

The polyurethane elastomer was of the type sold as "Estane" 5703 and was prepared by reacting a hydroxyl-terminated polyester of 1,4-butanediol and adipic acid with p,p'-diphenyl methane diisocyanate and 1,4-butanediol while maintaining an isocyanate:hydroxyl ratio somewhat less than 0.99 to yield a stable polymer with terminal hydroxyl groups. The phenoxy resin was a high molecular weight thermoplastic copolymer of equivalent amounts of bisphenol A and the diglycidyl ether of bisphenol A and was of the type sold as PKHH by Union Carbide Corporation.

After milling for 2 minutes, the mill was purged with carbon dioxide and 2,000 parts by weight of acicular gamma-$Fe_2O_3$ particles of 330 oersteds coercivity were added. Milling was continued for 7 minutes, followed by the addition of the following to the mill:

| | Parts by weight |
|---|---|
| The same polyurethane solution | 50 |
| The same phenoxy solution | 41 |
| Toluene | 563.8 |
| Methyl ethyl ketone | 402.7 |
| 33% solution of lecithin surfactant in toluene | 312 |
| 55% aluminum oxide dispersed with 1% lecithin in toluene | 72.8 |

Milling was continued for 4 hours and the viscosity was adjusted to 50 centipoises with a mixture of methyl ethyl ketone and toluene (3:2), followed by the addition of the following:

| | Parts by weight |
|---|---|
| The same polyurethane solution | 115 |
| Toluene | 36 |

Milling was continued for 2 hours, after which the dispersion was sampled for smoothness, and then the milling was continued in 2-hour increments until the dispersion was found to be smooth. At this point the following were added to the mill:

| | Parts by weight |
|---|---|
| Conductive carbon black | 150 |
| 33% solution of lecithin in toluene | 63 |
| Toluene | 138 |
| Methyl ethyl ketone | 68 |

Milling was continued in 2-hour increments until dispersion sample was smooth. After each 2-hour increment, the viscosity was checked and in each case the viscosity was within the acceptable range of $50 \pm 8$ TE units on Brookfield viscometer. After the dispersion was smooth, the following were added:

| | Parts by weight |
|---|---|
| The same polyurethane solution | 1500 |
| The same phenoxy solution | 297 |
| 40% solution of high molecular weight silicone polymer (Dow Corning "DC-200") in toluene | 6 |
| Methyl ethyl ketone | 568 |
| Toluene | 480 |

Milling was continued for 2 hours after which the percent solids of the dispersion was adjusted to 37.0 by adding methyl ethyl ketone/toluene (3:2) followed by milling an additional hour. During the entire milling process the temperature was maintained at about 100°F.

This dispersion was employed in making magnetic recording tape using apparatus as shown in FIG. 1 of the drawing. The backing member was biaxially-oriented polyethylene terephthalate polyester film 25 microns in thickness (100 gauge). The gravure roll had a knurl of 50 lines per inch.

Blended into this dispersion immediately prior to coating were 37 parts by weight of lubricant and 59.4 parts of a crosslinking agent for the polyurethane elastomer, viz., "PAPI" sold by the Polychemical Division of the Upjohn Company, which is polymethylene polyphenyl isocyanate having an average of 3.2 isocyanato groups per molecule. The coated polyester backing, after smoothing and passing through a flat magnetic field to orient the magnetizable particles in the longitudinal direction, was heated in an air circulating oven for about 1.5 minutes at about 160°F followed by 1.5 minutes at about 235°F to dry the coating and wound upon itself into roll form. The dried coating had a thickness of about 7 microns. About one hour later, the tape was unwound and polished.

After this tape was stored in roll form for five days at ambient conditions, an outer magnetizable coating was applied over the aforedescribed coating. The dispersion employed for the outer coating was made as follows. Charged to a small production mill were:

| | Parts by weight |
|---|---|
| 25% solution of the polyurethane elastomer in methyl ethyl ketone | 60 |
| 33% solution of lecithin in toluene | 90 |
| Lubricant | 4.5 |
| Methyl ethyl ketone | 119 |
| Toluene | 51 |
| Cyclohexanone | 119 |
| Xylene | 51 |

Added after milling for 10 minutes was 600 parts by weight of acicular gamma-$Fe_2O_3$ particles which had been modified with cobalt oxide to provide a coercivity of 500 oersteds. After further milling for 48 hours until a smooth dispersion was obtained, the following were added:

| | Parts by weight |
|---|---|
| Conductive carbon black | 18 |
| Cyclohexanone | 20 |

Milling was continued for about 16 hours until the dispersion was smooth, and the following were added:

| | Parts by weight |
|---|---|
| 25% solution of the polyurethane in methyl ethyl ketone | 130 |
| 30% solution of the phenoxy resin in methyl ethyl ketone | 54 |
| 55% aluminum oxide dispersed with 1% lecithin in toluene | 19 |
| Lubricant | 15 |

After 2 to 3 hours milling, the following were added:

| | Parts by weight |
|---|---|
| 40% solution of the silicone polymer ("DC-200") in toluene | 2.25 |
| Methyl ethyl ketone | 120 |
| Toluene | 55 |
| Cyclohexanone | 100 |
| Xylene | 55 |

After milling two hours, the viscosity was adjusted to 42 centipoises with a mixture of cyclohexanone and xylene (2:1).

This dispersion was coated over the first magnetizable coating and dried in the same manner as described above except the gravure roll had 150 lines per inch, the initial drying temperature was 130°F, the final drying temperature was 200°F, and the flat magnetic field through which the freshly applied coating was passed was aligned in the crosswise direction of the tape. Immediately prior to coating, 7.3 parts by weight of the same crosslinking agent was blended into the dispersion. The thickness of the dried coating was 1.5 microns. Within 1 hour, the surface was polished to an average roughness of about 0.04 to 0.09 micron.

To provide good winding characteristics, the tape was coated on the backside with a dispersion of conductive carbon black in a binder similar to that used in the magnetic recording layers.

The dual-layer tape of the example was tested for both video and audio recording capabilities. In the case of video testing, a 9 MHz unmodulated signal was recorded with an Ampex Model VR–2000 quadruplex video recorder, and record current was optimized for the dual-layer tape. Compared to a standard "Scotch" Brand No. 400 video tape, which is a current state-of-the-art commercial video recording tape, the dual-layer tape had 1.5 db greater RF output. The signal-to-noise ratio of the dual-layer tape was 4 db greater than the No. 400 tape.

Audio tests were conducted using an Ampex No. 440 audio recorder running with a tape speed of 15 inches per second. Audio sensitivity was 3 db greater than that of the No. 400 tape. In spite of having much less overall coating thickness, the dual-layer tape showed about 2 db more audio output than the No. 400 tape. By equating audio output to total tape remanence, it can be predicted that a dual-layer tape having a coating thickness equal to the No. 400 tape would have significantly greater audio output. Maximum audio output is defined as that output which is 8 db below the 3 percent third harmonic distortion level.

If the overall coating thickness of the tape of this example had been equal to that of present commercial tapes in order to be physically equivalent thereto, the two should not be spliced together because this sudden increase in audio signal level at the splice would be disturbing. Both physical and magnetic compatibility with present tapes can be obtained by orienting the magnetizable particles of the inner layer in the crosswise direction, or the inner layer may be unoriented or oriented to a minor degree if audio output is partially reduced by other means such as reduction in loading factor. Since maximum audio output is a desirable objective, it is likely that any such compromises will be made only on short-term bases.

The dual-layer magnetic recording tape of the present invention may employ various magnetizable particles such as fine iron particles. Magnetizable chromium dioxide particles of suitable coercivity may be used in either or both the inner and outer layers, but because of their high expense, such layers should be quite thin.

While only two magnetizable layers are entirely adequate for the purposes of the invention, additional magnetizable layers are not precluded. For example, a surface coating of only a fraction of a micron in thickness may be deposited onto the outer magnetizable layer by vacuum deposition or electroless plating of magnetizable material. Where the outer layer comprises magnetizable chromium dioxide particles, such a surface coating may inhibit the abrasiveness and sensitivity to moisture of the chromium dioxide.

We claim:

1. Quadruplex video recording tape affording improved video signal-to-noise ratio and greater audio output and sensitivity, which tape has a nonmagnetizable backing member carrying a dual-layer magnetizable coating of 2–15 microns in thickness, each of which layers is a homogeneous admixture comprising by weight a major proportion of magnetically anisotropic magnetizable particles and a minor proportion of nonmagnetic binder, characterized by the feature that the inner magnetizable layer has a thickness of at least 1.25 microns and its magnetizable particles are oriented so that their magnetically anisotropic axes extend predominantly in the longitudinal direction of the tape and provide a longitudinal coercivity of 240–600 oersteds, and the outer magnetizable layer has a thickness of 0.5–3 microns, a surface roughness not exceeding 0.2 micron, and its magnetizable particles are oriented so that their magnetically anisotropic axes extend predominantly in the crosswise direction of the tape and provide a crosswise coercivity of 375–1,000 oersteds and greater than the longitudinal coercivity of the inner layer.

2. Quadruplex video recording tape as defined in claim 1 wherein the magnetizable particles of the outer layer comprise cobalt oxide modified acicular gamma-iron oxide particles.

3. Quadruplex video recording tape as defined in claim 1 wherein the magnetizable particles of at least one layer comprise chromium dioxide.

* * * * *